(12) United States Patent
Rhodes et al.

(10) Patent No.: US 10,711,506 B2
(45) Date of Patent: Jul. 14, 2020

(54) CHARGE PORT ASSEMBLY WITH MOTORIZED IRIS DOOR

(71) Applicant: FORD GLOBAL TECHNOLOGIES, LLC, Dearborn, MI (US)

(72) Inventors: Kevin James Rhodes, Dearborn, MI (US); Pallav Sohoni, Farmington Hills, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 294 days.

(21) Appl. No.: 15/782,913

(22) Filed: Oct. 13, 2017

(65) Prior Publication Data

US 2019/0111795 A1  Apr. 18, 2019

(51) Int. Cl.
| | | |
|---|---|---|
| E05F 15/76 | (2015.01) | |
| B60L 53/16 | (2019.01) | |
| E05F 15/603 | (2015.01) | |

(52) U.S. Cl.
CPC .............. *E05F 15/76* (2015.01); *B60L 53/16* (2019.02); *E05F 15/603* (2015.01); *B60L 2270/30* (2013.01); *E05Y 2400/40* (2013.01); *E05Y 2400/44* (2013.01); *E05Y 2400/852* (2013.01); *E05Y 2900/53* (2013.01)

(58) Field of Classification Search
CPC .. B60L 11/1818; B60L 53/16; B60L 11/1816; B60L 2270/32; B60L 2270/34; B60L 11/1877; B60L 2250/16; E06B 3/34; E05F 15/73; E05F 15/40; E05F 15/611; E05F 15/632; E05F 15/659; E05F 5/022

USPC .......... 296/97.22, 136.01, 146.9, 155, 183.1, 296/37.8; 220/86.2, 203.01, 211, 23.83, 220/375, 378, 746, 829, 830; 49/394, 49/325, 26, 323, 324, 386, 506, 70
See application file for complete search history.

(56) References Cited

U.S. PATENT DOCUMENTS

| | | | |
|---|---|---|---|
| 7,999,665 B2 | 8/2011 | Chander et al. | |
| 8,393,423 B2 | 3/2013 | Gwozdek et al. | |
| 8,905,458 B2 | 12/2014 | Pipp et al. | |
| 8,905,768 B2* | 12/2014 | Hara | H01R 13/447 439/136 |
| 9,168,840 B2 | 10/2015 | Nakajima | |
| 9,597,968 B2 | 3/2017 | Schoener et al. | |
| 9,656,561 B2 | 5/2017 | Yoo | |
| 9,944,240 B1* | 4/2018 | Fabian | H01R 13/447 |
| 2008/0142637 A1* | 6/2008 | Lesage | H01R 13/5213 244/129.1 |
| 2010/0150544 A1* | 6/2010 | Koop | G03B 9/08 396/453 |
| 2011/0132905 A1* | 6/2011 | Ognjanovski | B60K 15/0406 220/86.2 |
| 2013/0078846 A1* | 3/2013 | Sasaki | H01R 13/5227 439/374 |

(Continued)

*Primary Examiner* — D Glenn Dayoan
*Assistant Examiner* — Sunsurraye Westbrook
(74) *Attorney, Agent, or Firm* — David B. Kelley; Carlson, Gaskey & Olds

(57) ABSTRACT

A charge port assembly includes a port, an iris door movable to expose the port, and a motorized actuating assembly configured to move the iris door between a closed position in which the port is concealed and an open position in which the port is exposed. The iris door may be automatically dilated to the open position in response to a predefined prompt from an authorized user or if a charging cord is approaching the charge port assembly.

18 Claims, 6 Drawing Sheets

(56) References Cited

U.S. PATENT DOCUMENTS

2017/0315215 A1* 11/2017 Berezin .................. G01S 7/412

* cited by examiner

CHARGE PORT ASSEMBLY WITH MOTORIZED IRIS DOOR

TECHNICAL FIELD

This disclosure relates to electrified vehicle charge port assemblies that include motorized iris doors for permitting and restricting access to charging ports.

BACKGROUND

The need to reduce automotive fuel consumption and emissions is well known. Therefore, vehicles are being developed that reduce reliance on internal combustion engines. Electrified vehicles are one type of vehicle being developed for this purpose. In general, electrified vehicles differ from conventional motor vehicles because they are selectively driven by one or more battery powered electric machines. Conventional motor vehicles, by contrast, rely exclusively on the internal combustion engine to drive the vehicle.

A charging system can be used to connect some electrified vehicles to an external power source, such as a wall outlet or a charging station, to charge the electrified vehicle battery pack. Plug-in hybrid electric vehicles and battery electric vehicles, for example, typically include a charge port assembly that provides a port for plugging a charging cord into the charge port assembly. A door of the charge port assembly is manually opened and closed for accessing the port. Existing charge port designs are susceptible to the elements (e.g., rain and snow) during charging and are not capable of preventing the charging cord from being disconnected from the vehicle by unauthorized users.

SUMMARY

A charge port assembly for an electrified vehicle according to an exemplary aspect of the present disclosure includes, among other things, a port, an iris door movable to expose the port, and a motorized actuating assembly configured to move the iris door between a closed position in which the port is concealed and an open position in which the port is exposed.

In a further non-limiting embodiment of the foregoing charge port assembly, the iris door includes a plurality of overlapping blades.

In a further non-limiting embodiment of either of the foregoing charge port assemblies, the plurality of overlapping blades are positioned radially inwardly in the closed position and radially outwardly in the open position.

In a further non-limiting embodiment of any of the foregoing charge port assemblies, the plurality of overlapping blades are at least partially tucked behind a radially outer disk of a housing of the charge port assembly in the open position.

In a further non-limiting embodiment of any of the foregoing charge port assemblies, the motorized actuating assembly is configured to move the iris door from the open position to an intermediate position after a charging cord is plugged into the port.

In a further non-limiting embodiment of any of the foregoing charge port assemblies, the motorized actuating assembly includes a motor, a gear, and a gear ring.

In a further non-limiting embodiment of any of the foregoing charge port assemblies, the motor is configured to drive the gear which, in response, drives the gear ring.

In a further non-limiting embodiment of any of the foregoing charge port assemblies, linkages connect between the gear ring and a plurality of overlapping blades of the iris door. Movement of the gear ring pivots the linkages and, in response, moves the plurality of overlapping blades.

In a further non-limiting embodiment of any of the foregoing charge port assemblies, the motorized actuating assembly includes a sensor system and a control module that cooperate to control movement of the iris door.

In a further non-limiting embodiment of any of the foregoing charge port assemblies, the control module is configured to command the iris door to the open position in response to receiving a plug approach signal from the sensor system.

In a further non-limiting embodiment of any of the foregoing charge port assemblies, the control module is configured to command the iris door to an intermediate position that is between the closed position and the open position in response to receiving a plug connection signal from the sensor system.

In a further non-limiting embodiment of any of the foregoing charge port assemblies, the motorized actuating assembly includes a control module configured to command the iris door to the open position in response to a predefined prompt from an authorized user.

A method according to another exemplary aspect of the present disclosure includes, among other things, automatically dilating an iris door of a charge port assembly of an electrified vehicle to an open position in response to a predefined prompt from an authorized user of the electrified vehicle or if a charging cord is approaching the charge port assembly.

In a further non-limiting embodiment of the foregoing method, the predefined prompt includes actuating a button on a keyfob or a personal electronic device of the authorized user.

In a further non-limiting embodiment of either of the foregoing methods, the predefined prompt includes actuating a button located in a passenger cabin of the electrified vehicle.

In a further non-limiting embodiment of any of the foregoing methods, the method includes plugging the charging cord into a port of the charge port assembly and moving the iris door from the open position to an intermediate position in which the iris door is closed around a plug of the charging cord.

In a further non-limiting embodiment of any of the foregoing methods, the method includes detecting the authorized user near the electrified vehicle and moving the iris door from the intermediate position back to the open position in response to detecting the authorized user.

In a further non-limiting embodiment of any of the foregoing methods, the method includes unplugging the charging cord from the port and moving the iris door from the open position to a closed position in which the port is concealed behind the iris door.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure describes charge port assemblies for electrified vehicles. An exemplary charge port assembly includes a port, an iris door, and a motorized actuating assembly. The motorized actuating assembly is configured to move the iris door between a closed position in which the port is concealed and an open position in which the port is exposed for receiving a charging cord. The iris door may be automatically moved to expose the port in response to a predefined prompt from a user (e.g., actuating a button on a keyfob or inside the vehicle passenger cabin) or in response to sensing that the charging cord is approaching the port. These and other features of this disclosure are discussed in greater detail in the following paragraphs of this detailed description.

Figure 1:
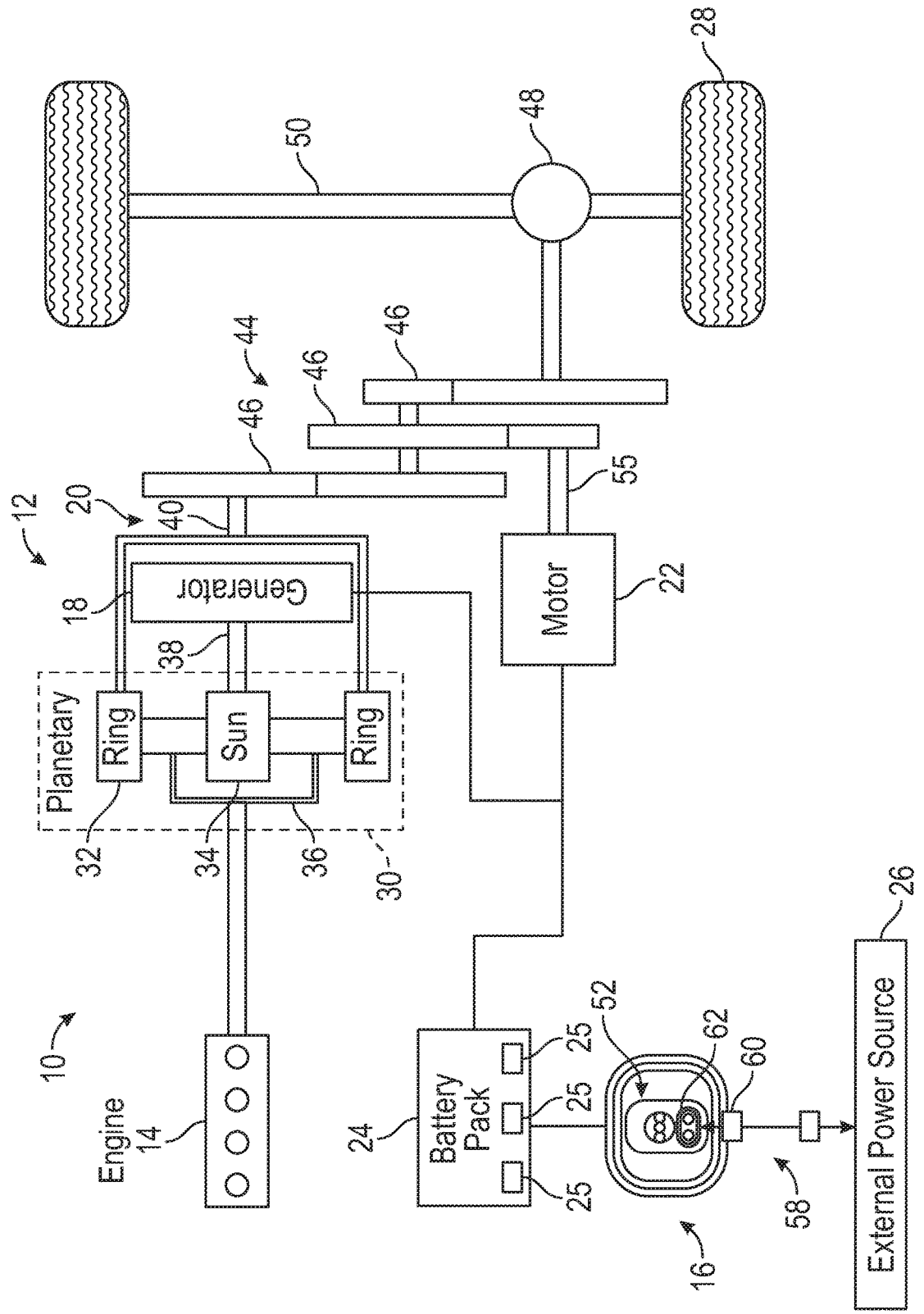
FIG. 1 schematically illustrates a powertrain of an electrified vehicle.

FIG. 1 schematically illustrates a powertrain 10 for an electrified vehicle 12. In an embodiment, the electrified vehicle 12 is a plug-in hybrid electric vehicle (PHEV). However, other electrified vehicles could also benefit from the teachings of this disclosure, including but not limited to, battery electric vehicles (BEV's).

In an embodiment, the powertrain 10 is a power-split powertrain system that employs a first drive system and a second drive system. The first drive system may include a combination of an engine 14 and a generator 18 (i.e., a first electric machine). The second drive system includes at least a motor 22 (i.e., a second electric machine) and a battery pack 24. In this example, the second drive system is considered an electric drive system of the powertrain 10. The first and second drive systems generate torque to drive one or more sets of vehicle drive wheels 28 of the electrified vehicle 12.

The engine 14, which in an embodiment is an internal combustion engine, and the generator 18 may be connected through a power transfer unit 30, such as a planetary gear set. Of course, other types of power transfer units, including other gear sets and transmissions, may be used to connect the engine 14 to the generator 18. In one non-limiting embodiment, the power transfer unit 30 is a planetary gear set that includes a ring gear 32, a sun gear 34, and a carrier assembly 36.

The generator 18 can be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In one embodiment, the second power transfer unit 44 is mechanically coupled to an axle 50 through the differential 48 to distribute torque to the vehicle drive wheels 28. In one embodiment, the power transfer units 30, 44 are part of a transaxle 20 of the electrified vehicle 12.

The motor 22 can also be employed to drive the vehicle drive wheels 28 by outputting torque to a shaft 55 that is also connected to the second power transfer unit 44. In one embodiment, the motor 22 is part of a regenerative braking system. For example, the motor 22 can each output electrical power to the battery pack 24.

The battery pack 24 is an exemplary electrified vehicle battery. The battery pack 24 may be a high voltage traction battery pack that includes a plurality of battery assemblies 25 (i.e., battery arrays or groupings of battery cells) capable of outputting electrical power to operate the motor 22, the generator 18 and/or other electrical loads of the electrified vehicle 12. Other types of energy storage devices and/or output devices can also be used to electrically power the electrified vehicle 12.

In a non-limiting embodiment, the electrified vehicle 12 has two basic operating modes. The electrified vehicle 12 may operate in an Electric Vehicle (EV) mode where the motor 22 is used (generally without assistance from the engine 14) for vehicle propulsion, thereby depleting the battery pack 24 state of charge up to its maximum allowable discharging rate under certain driving patterns/cycles. The EV mode is an example of a charge depleting mode of operation for the electrified vehicle 12. During EV mode, the state of charge of the battery pack 24 may increase in some circumstances, for example due to a period of regenerative braking. The engine 14 is generally OFF under a default EV mode but could be operated as necessary based on a vehicle system state or as permitted by the operator.

The electrified vehicle 12 may additionally operate in a Hybrid (HEV) mode in which the engine 14 and the motor 22 are both used for vehicle propulsion. The HEV mode is an example of a charge sustaining mode of operation for the electrified vehicle 12. During the HEV mode, the electrified vehicle 12 may reduce the motor 22 propulsion usage in order to maintain the state of charge of the battery pack 24 at a constant or approximately constant level by increasing the engine 14 propulsion. The electrified vehicle 12 may be operated in other operating modes in addition to the EV and HEV modes within the scope of this disclosure.

The powertrain 10 shown in FIG. 1 is highly schematic and is not intended to limit this disclosure. Various additional components could alternatively or additionally be employed by the powertrain 10 within the scope of this disclosure. In addition, the teachings of this disclosure may be incorporated into any type of electrified vehicle.

Figure 2:
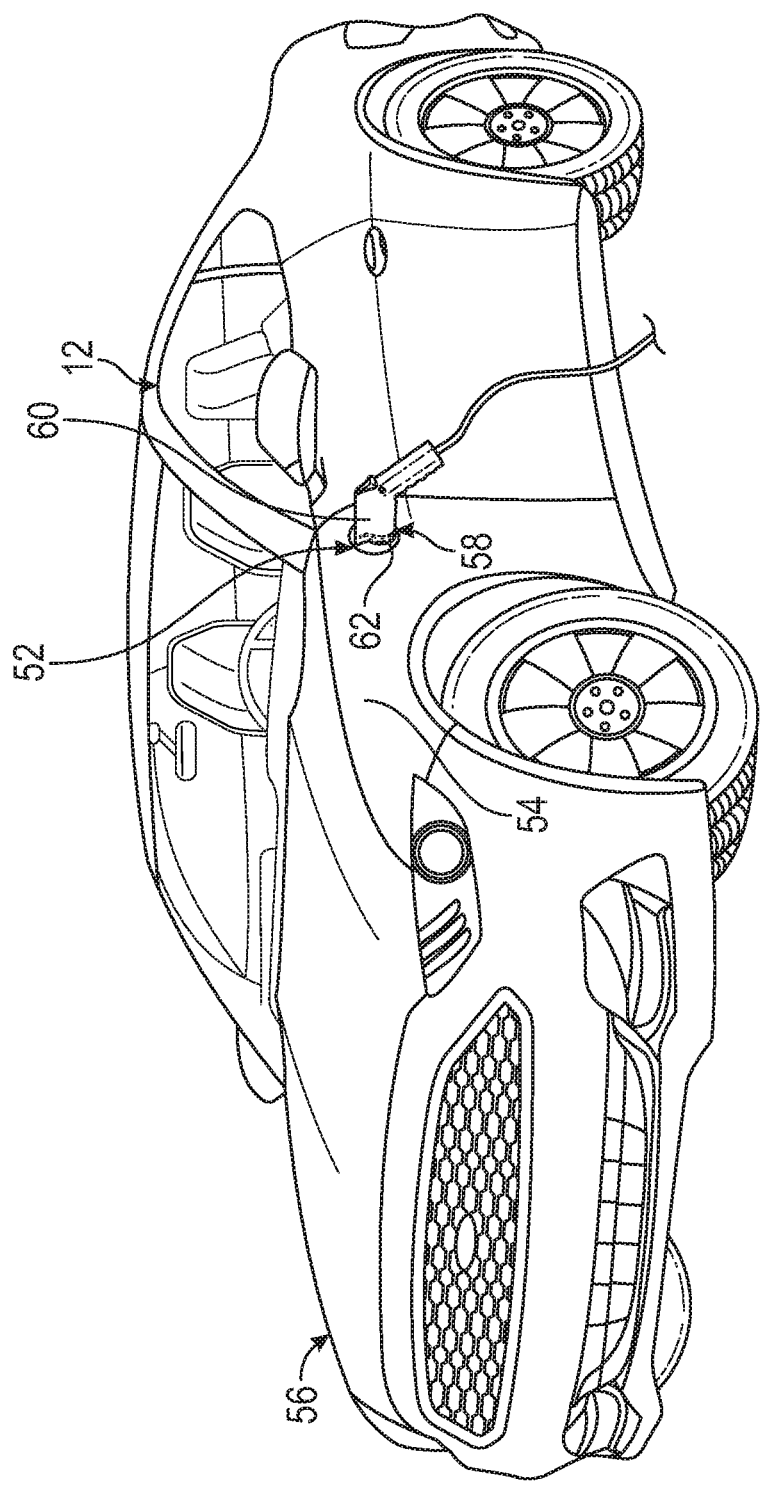
FIG. 2 illustrates a charge port assembly of the electrified vehicle of FIG. 1.

Referring now to FIGS. 1 and 2, the electrified vehicle 12 includes a charging system 16 for charging the energy storage devices (e.g., battery cells) of the battery pack 24. The charging system 16 is connectable to an external power source 26 (e.g., utility/grid power from an electrical grid) for receiving and distributing power throughout the electrified vehicle 12. In an embodiment, the charging system 16 includes a charge port assembly 52 located on-board the electrified vehicle 12. The charge port assembly 52 may be supported on an outer panel 54 of a vehicle body 56 of the electrified vehicle 12. The outer panel 54 could be a front quarter panel, a rear quarter panel, or any other outer panel of the vehicle body 56.

The charge port assembly 52 is adapted to selectively receive power from the external power source 26 via a charging cord 58 and then supply the power to the battery pack 24 for charging the battery cells. The charging cord 58 may include a plug 60 that is configured to plug into a port 62 provided by the charge port assembly 52. The charging cord 58 may be a component of a vehicle charging station or separate electric vehicle supply equipment (EVSE) that is provided and stored with the electrified vehicle 12.

Figure 3:
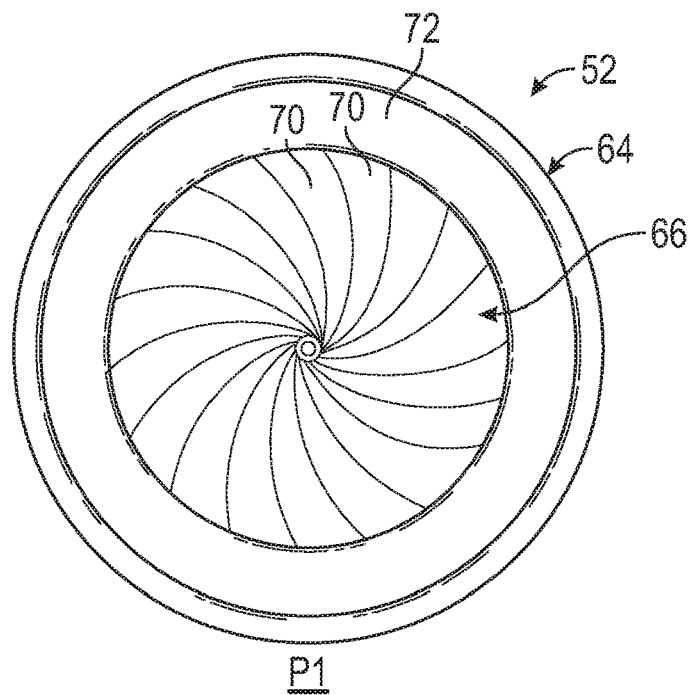
FIG. 3 illustrates a closed position of an iris door of a charge port assembly.
Figure 4:
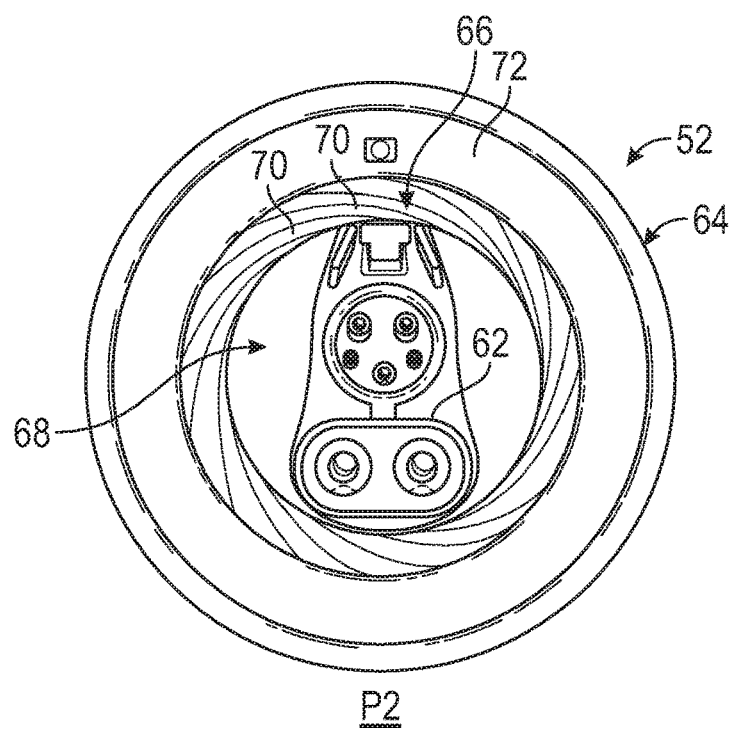
FIG. 4 illustrates an open position of an iris door of a charge port assembly.
Figure 5:
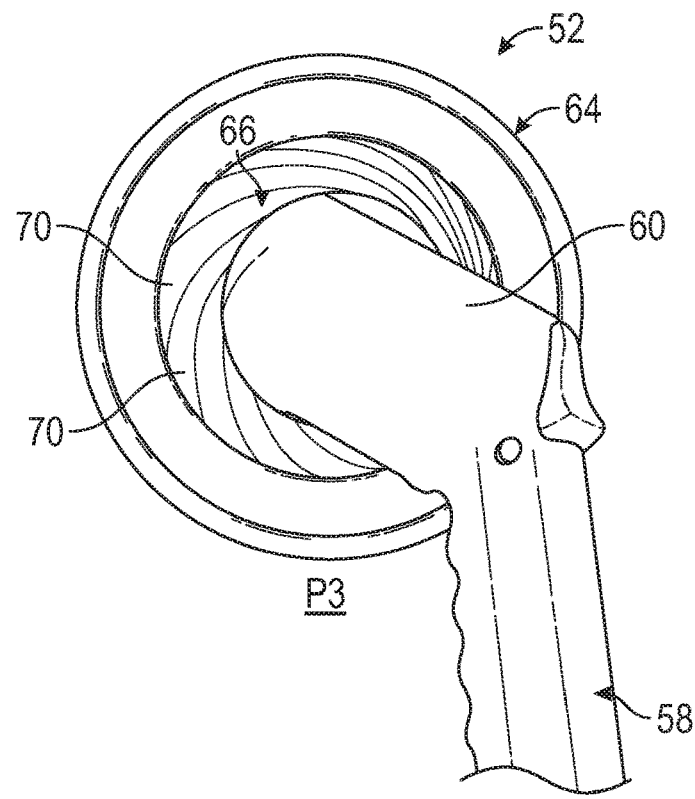
FIG. 5 illustrates an intermediate position of an iris door of a charge port assembly.

FIGS. 3-5, with continued reference to FIGS. 1 and 2, illustrate an exemplary charge port assembly 52 for the electrified vehicle 12. For example, the charge port assembly 52 may be part of the charging system 16 of the electrified vehicle 12.

In an embodiment, the charge port assembly 52 includes a housing 64, the port 62, and an iris door 66 for selectively permitting and restricting access to the port 62. The size and shape of the housing 64 is not intended to limit this disclosure. The port 62 is supported within an opening 68 of the housing 64. The port 62 may be configured for connecting to any type of charging cord (e.g., level 1, 2, DC, etc.).

The iris door 66 is controllable to close and open the opening 68 of the housing 64 for accessing the port 62. The iris door 66 is shown in a closed position P1 is FIG. 3 and in an open position P2 in FIG. 4. In the closed position P1, the port 62 is concealed behind the iris door 66. The iris door 66 therefore blocks the port 62 from the ingress of snow, rain, dust, or other possible contaminants. In the open position P2, the port 62 is not concealed by the iris door 66 and is therefore exposed for connecting the charging cord 58.

The iris door 66 may operate similarly to an iris of a camera in order to expand and restrict the opening 68. In an embodiment, the iris door 66 includes a plurality of overlapping blades 70 that are moveable to open and close the opening 68. The iris door 66 may include any number of overlapping blades 70. The total number of blades making up the iris door 66 is not intended to limit this disclosure. In the closed position P2 of the iris door 66, the overlapping blades 70 are at least partially tucked behind a radially outer disk 72 of the housing 64 in order to expose the port 62. In the open position P1 of the iris door 66, the overlapping blades 70 extend radially inwardly from the radially outer disk 72 in order to conceal the port 62.

The charging cord 58 may be plugged into the port 62 for charging the electrified vehicle 12 after the iris door 66 is moved to the open position P2. Subsequent to plugging the plug 60 of the charging cord 58 into the port 62, the iris door 66 may be moved from the open position P2 to an intermediate position P3 (see FIG. 5). In the intermediate position P3, the overlapping blades 70 are moved radially inwardly until they close down around the plug 60. The intermediate position P3 is therefore radially between the closed position P1 and the open position P2.

Figure 6:
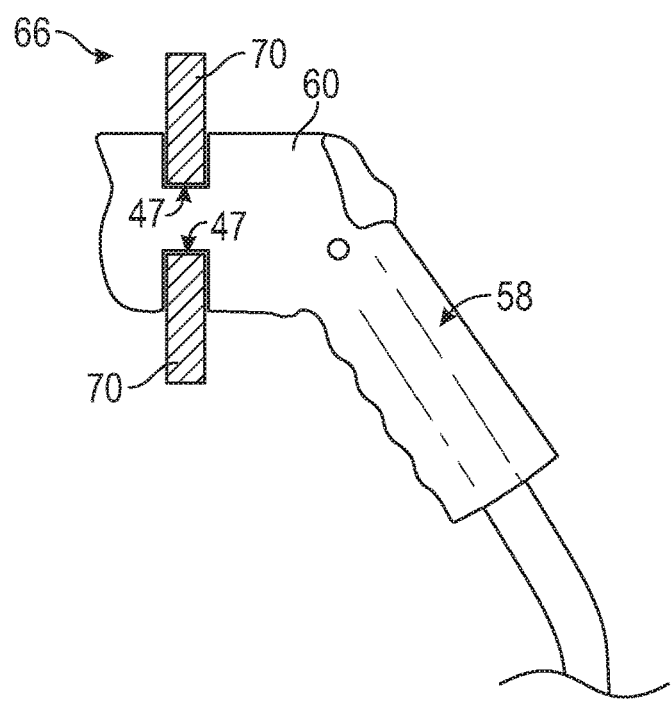
FIG. 6 is a cross-sectional view illustrating the iris door of FIG. 5 closed around a charging cord.

In an embodiment, the overlapping blades 70 are received within a recessed groove 74 of the plug 60 of the charging cord 58 in the intermediate position P3 (see, e.g., FIG. 6). In this way, the iris door 66 acts as a security feature for locking the charging cord 58 in place during charging. This protects the charging cord 58 and the port 62 from water and dirt ingress during charging and also reduces the risk of an unauthorized user unplugging and stealing the charging cord 58 since the overlapping blades 70 will not allow the charging cord 58 to be easily removed from the port 62 when received within the recessed groove 74.

Figure 7:
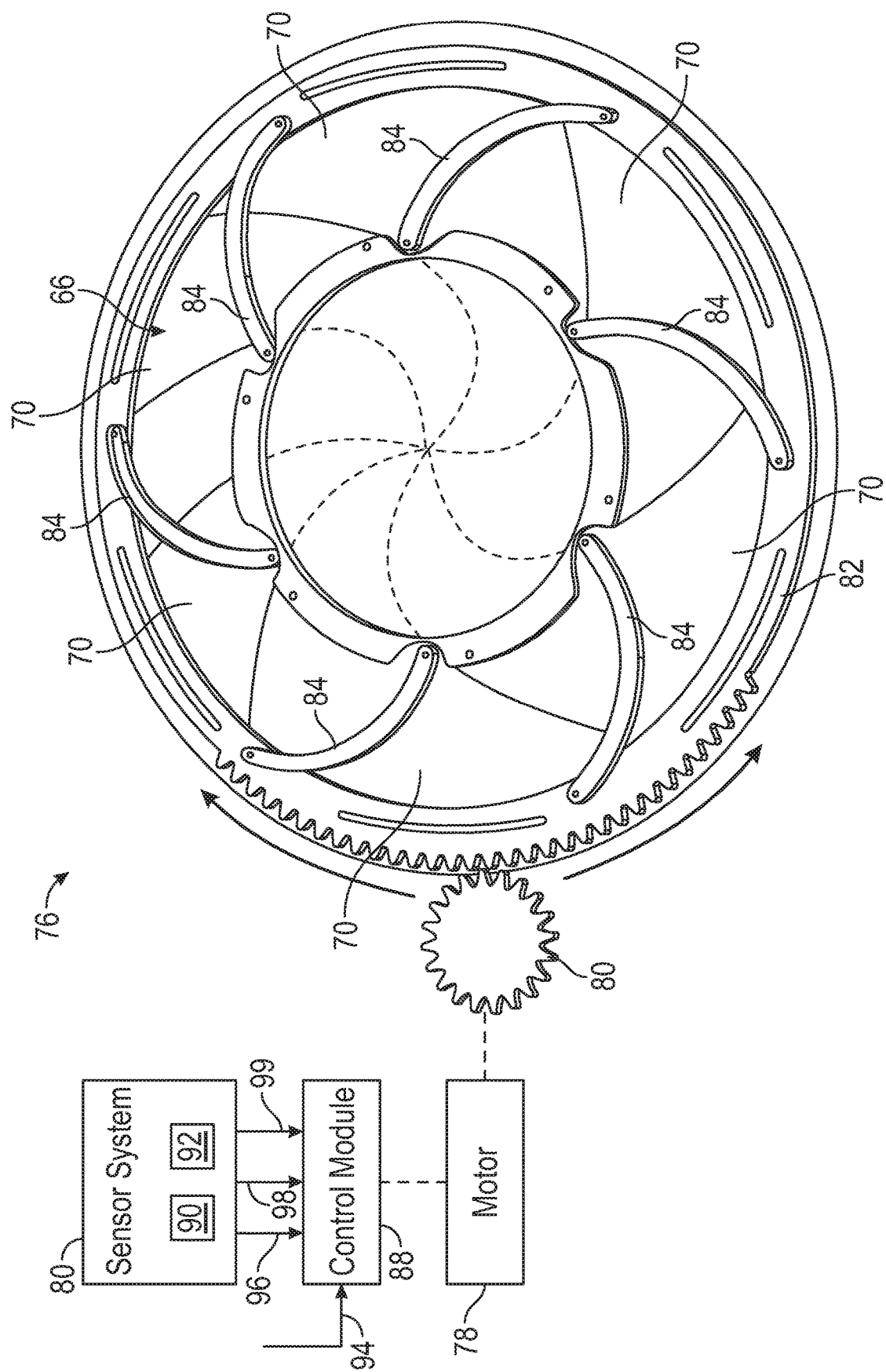
FIG. 7 schematically illustrates a motorized actuating assembly of a charge port assembly.

FIG. 7 illustrates an exemplary motorized actuating assembly 76 for automatically moving the iris door 66 between the various positions P1, P2, and P3. In an embodiment, the motorized actuating assembly 76 includes a motor 78, a gear 80, a gear ring 82, linkages 84, and the overlapping blades 70.

The motor 78 may be an electric motor or any other motorized device. The motor 78 may operatively coupled to the gear 80 and may be energized to rotate the gear 80 either clockwise or counterclockwise. The gear 80 is in mesh engagement with the gear ring 82, and therefore the gear ring 82 also rotates in response to rotating the gear 80. In an embodiment, the motor 78 can be controlled to drive the gear 80 in a first direction in order to move the gear ring 82 in a manner that moves the overlapping blades 70 to the closed position P1. In another embodiment, the motor 78 can be controlled to drive the gear 80 in a second direction in order to move the gear ring 82 in a manner that dilates the overlapping blades 70 to the open position P2. In yet another embodiment, the motor 78 can be controlled to drive the gear 80 in the first direction in order to move the gear ring 82 in a manner that moves the overlapping blades 70 toward the intermediate position P3.

Each linkage 84 connects between the gear ring 82 and one of the plurality of overlapping blades 70. As the gear ring 82 moves, the linkages 84 may pivot relative to the gear ring 82 to move the overlapping blades 70 either radially inwardly or radially outwardly.

The motorized actuating assembly 76 may additionally include a sensor system 86 and a control module 88 that cooperate to determine when and how to position the iris door 66 of the charge port assembly 52. The sensor system 86 is adapted to sense the connection status of the charging cord 58, or whether the charging cord 58 is approaching the charge port assembly 52 for connection to the port 62, or whether an authorized user is near (i.e., within a predefined range of) the charge port assembly 52. The sensor system 86 may include various sensors for making these determinations. For example, a connection sensor 90 may be positioned within the port 62 for detecting whether the charging cord 58 is plugged into the port 62, and one or more proximity sensors 92 may be positioned for detecting whether the charging cord 58 is approaching the charge port assembly 52. The proximity sensor 92 may be mounted directly to the housing 64, near the housing 64, or to the port 62 of the charge port assembly 52. In another embodiment, the proximity sensors 92 are configured to detect whether a keyfob or other personal electronic device (e.g., phone) of an authorized user of the electrified vehicle 12 is near the electrified vehicle 12. The proximity sensors 92 may be capacitive, ultrasonic, magnetic, weight, lidar, infrared, induction, radar, or any other type of sensors or combination of sensors.

The control module 88 is adapted to control the various functions of the charge port assembly 52. In an embodiment, the control module 88 includes a processing unit and nontransitory memory for executing the various control strategies of the charge port assembly 52.

The control module 88 may receive and process various inputs for controlling the charge port assembly 52, and more particularly, for controlling the positioning of the iris door 66. A first input to the control module 88 may include a user request signal 94 received in response to a predefined prompt from an authorized user of the electrified vehicle 12 (e.g., actuating a keyfob, actuating a button located in the vehicle passenger cabin, or actuating a personal electronic device). The user request signal 94 indicates that the user wishes to open the iris door 66 for connecting the charging cord 58 to the port 62, or indicates that the user wishes to close the iris door 66 after removing the charging cord 58 from the port 62. In response to receiving the user request signal 94, the control module 88 may automatically command the iris door 66 to either the open position P2 or the closed position P1 depending on what position the iris door 66 is in immediately before the user request signal 94 is received.

A second input to the control module 88 may include a plug approach signal 96 from the sensor system 86. The plug approach signal 96 indicates that the sensor system 86 has detected the presence of the charging cord 58 approaching the charge port assembly 52. The control module 88 may automatically command the iris door 66 to the open position P2 in response to receiving the plug approach signal 96.

A third input to the control module 88 may include a plug connection signal 98 from the sensor system 86. The plug connection signal 98 indicates that the charging cord 58 has been plugged into the port 62. In response to receiving the plug connection signal 98, the control module 88 may control the amount of charge supplied from the charging cord 58 to the electrified vehicle during a charging event. For example, the control module 88 may control the amount of voltage and current that is supplied during the charging event as well as the length of the charge, among various other parameters. In addition, the control module 88 may automatically command the iris door 66 to the intermediate position P3 in response to receiving the plug connection signal 98.

A fourth input to the control module 88 may include a user proximity signal 99 from the sensor system 86. The user proximity signal 99 indicates that the sensor system 86 has detected an authorized user near the electrified vehicle 12. In response to receiving the user proximity signal 99, the control module 88 may automatically command the iris door 66 to the open position P2 in order to unlock the charging cord 58 (i.e., release the overlapping blades 70 from the recessed groove 74).

Figure 8:
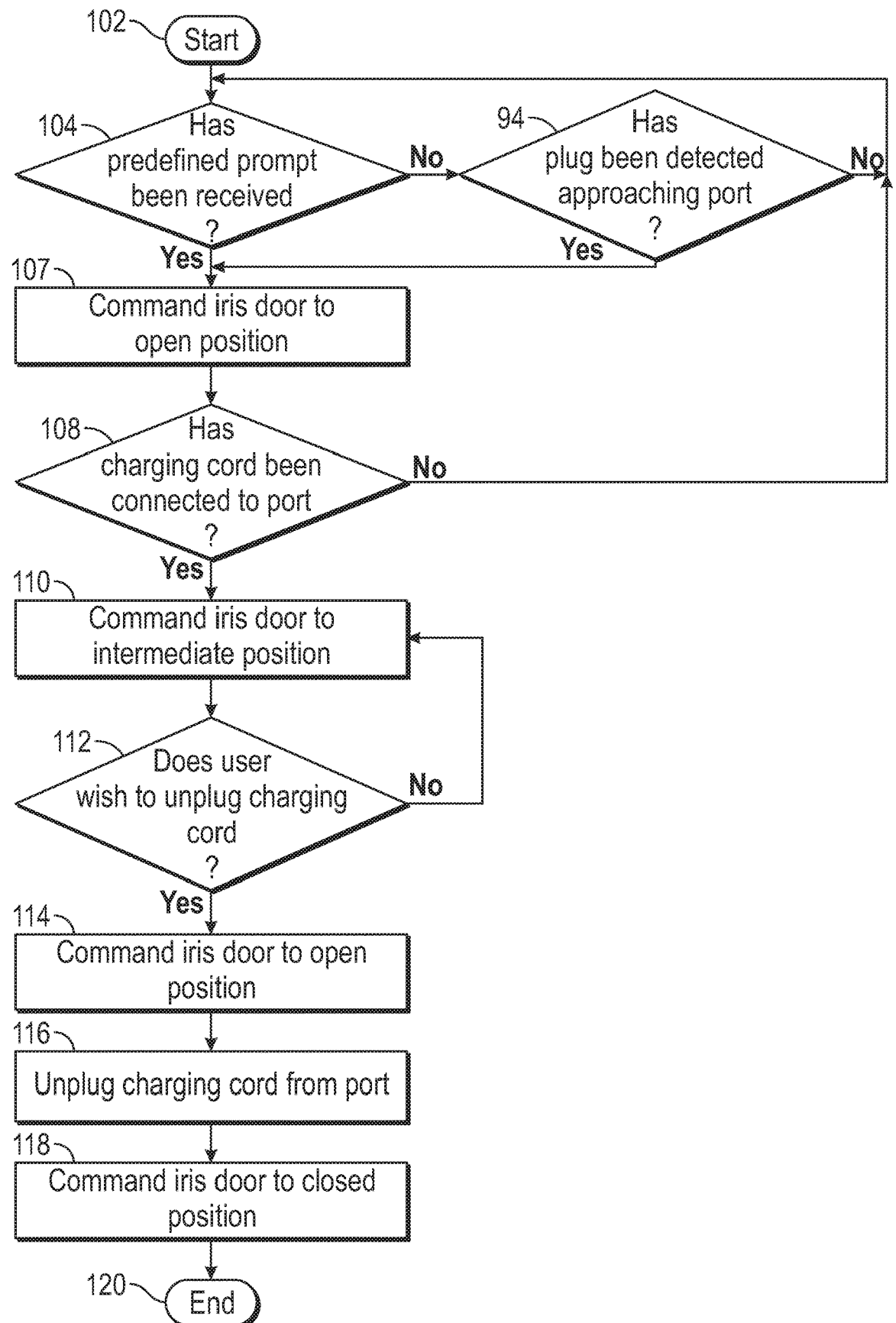
FIG. 8 schematically illustrates a method for controlling an iris door of a charge port assembly.

FIG. 8, with continued reference to FIGS. 1-7, schematically illustrates a method 100 for controlling the iris door 66 of the charge port assembly 52. In an embodiment, the control module 88 is programmed with one or more algorithms adapted to execute the exemplary method 100.

The exemplary method 100 begins at block 102. At block 104, the control module 88 monitors whether a predefined prompt has been received indicating that a charging event is about to occur. For example, the control module 88 may periodically monitor whether the user request signal 94 has been received to determine whether the user wishes to charge the electrified vehicle. If NO, the control module 88 checks whether the plug 60 of the charging cord 58 has been detected approaching the charge port assembly 52 at block 106. If either of blocks 104 or 106 return YES flags, the iris door 66 is commanded to the open position P2 at block 107.

Next, at block 108, the control module 88 monitors whether the plug 60 of the charging cord 58 has been connected to the port 62. If YES, indicating that the plug connection signal 98 has been received from the sensor system 86, the control module 88 commands the iris door 66 to the intermediate position P3 at block 110. The overlapping blades 70 are received within the recessed groove 74 of the plug 60 when the iris door 66 is positioned in the intermediate position P3 to temporarily lock the charging cord 58 in place. This prevents unauthorized removal of the charging cord 58 during charging.

The control module 88 may next monitor whether the user wishes to unplug the charging cord 58 from the port 62 at block 112. For example, the control module 88 may monitor whether either the user request signal 94 or the user proximity signal 99 have been received in order to make this determination. If YES, the iris door 66 is automatically returned to the open position P2 at block 114. The charging cord 58 is unplugged from the port 62 at block 116, and the iris door 66 may be commanded to the closed position P1 at block 118. The method 100 may then end at block 120.

The charge port assemblies of this disclosure are configured to selectively restrict and permit access to charging ports of the assemblies. The proposed designs are aesthetically pleasing and provide protection and security during both charging and non-charging events.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A charge port assembly for an electrified vehicle, comprising:
   a port;
   an iris door movable to expose the port; and
   a motorized actuating assembly configured to move the iris door between a closed position in which the port is concealed and an open position in which the port is exposed.

2. The charge port assembly as recited in claim 1, wherein the iris door includes a plurality of overlapping blades.

3. The charge port assembly as recited in claim 2, wherein the plurality of overlapping blades are positioned radially inwardly in the closed position and radially outwardly in the open position.

4. The charge port assembly as recited in claim 2, wherein the plurality of overlapping blades are at least partially tucked behind a radially outer disk of a housing of the charge port assembly in the open position.

5. The charge port assembly as recited in claim 1, wherein the motorized actuating assembly is configured to move the iris door from the open position to an intermediate position after a charging cord is plugged into the port.

6. The charge port assembly as recited in claim 1, wherein the motorized actuating assembly includes a motor, a gear, and a gear ring.

7. The charge port assembly as recited in claim 6, wherein the motor is configured to drive the gear which, in response, drives the gear ring.

8. The charge port assembly as recited in claim 7, comprising linkages connecting between the gear ring and a plurality of overlapping blades of the iris door, wherein movement of the gear ring pivots the linkages and, in response, moves the plurality of overlapping blades.

9. The charge port assembly as recited in claim 1, wherein the motorized actuating assembly includes a sensor system and a control module that cooperate to control movement of the iris door.

10. The charge port assembly as recited in claim 9, wherein the control module is configured to command the iris door to the open position in response to receiving a plug approach signal from the sensor system.

11. The charge port assembly as recited in claim 9, wherein the control module is configured to command the iris door to an intermediate position that is between the closed position and the open position in response to receiving a plug connection signal from the sensor system.

12. A charge port assembly for an electrified vehicle, comprising:
a port;
an iris door movable to expose the port; and
a motorized actuating assembly configured to move the iris door between a closed position in which the port is concealed and an open position in which the port is exposed,
wherein the motorized actuating assembly includes a control module configured to command the iris door to the open position in response to a predefined prompt from an authorized user.

13. A method, comprising:
automatically dilating an iris door of a charge port assembly of an electrified vehicle to an open position in response to a predefined prompt from an authorized user of the electrified vehicle or when a charging cord is approaching the charge port assembly.

14. The method as recited in claim 13, wherein the predefined prompt includes actuating a button on a keyfob or a personal electronic device of the authorized user.

15. The method as recited in claim 13, wherein the predefined prompt includes actuating a button located in a passenger cabin of the electrified vehicle.

16. The method as recited in claim 13, comprising:
plugging the charging cord into a port of the charge port assembly; and
moving the iris door from the open position to an intermediate position in which the iris door is closed around a plug of the charging cord.

17. The method as recited in claim 16, comprising:
detecting the authorized user near the electrified vehicle; and
moving the iris door from the intermediate position back to the open position in response to detecting the authorized user.

18. The method as recited in claim 17, comprising:
unplugging the charging cord from the port; and
moving the iris door from the open position to a closed position in which the port is concealed behind the iris door.

* * * * *